United States Patent
Daniel (10) Patent No.: US 8,854,205 B2
(45) Date of Patent: Oct. 7, 2014

(54) SYSTEM AND METHOD FOR COUNTERING TERRORISM BY MONITORING CONTAINERS OVER INTERNATIONAL SEAS

(75) Inventor: Isaac S. Daniel, Miramar, FL (US)

(73) Assignee: The F3M3 Companies, Inc.

( * ) Notice: Subject to any disclaimer, the term of this patent is extended or adjusted under 35 U.S.C. 154(b) by 655 days.

(21) Appl. No.: 13/003,913

(22) PCT Filed: Jul. 18, 2008

(86) PCT No.: PCT/US2008/008780
§ 371 (c)(1),
(2), (4) Date: Jan. 13, 2011

(87) PCT Pub. No.: WO2010/008363
PCT Pub. Date: Feb. 21, 2010

(65) Prior Publication Data
US 2011/0128143 A1 Jun. 2, 2011

(51) Int. Cl.
G08B 1/08 (2006.01)
G08B 21/22 (2006.01)
G06Q 10/08 (2012.01)
G06Q 50/28 (2012.01)
G08B 21/02 (2006.01)

(52) U.S. Cl.
CPC .............. *G08B 21/22* (2013.01); *G06Q 10/08* (2013.01); *G06Q 50/28* (2013.01); *G08B 21/0261* (2013.01); *G08B 21/0269* (2013.01); *G08B 21/0286* (2013.01)
USPC ................... 340/539.1; 340/540; 340/539.13; 340/2.1; 340/2.23; 340/3.5

(58) Field of Classification Search
USPC ........... 340/539.1, 540, 539.13, 2.1, 2.23, 3.5
See application file for complete search history.

(56) References Cited

U.S. PATENT DOCUMENTS

| | | | |
|---|---|---|---|
| 5,527,122 A * | 6/1996 | Carter | 400/496 |
| 7,283,052 B2 * | 10/2007 | Bohman et al. | 340/572.1 |
| 7,312,702 B1 * | 12/2007 | Willms et al. | 340/540 |
| 7,498,938 B2 * | 3/2009 | Ulrich | 340/539.13 |
| 7,714,708 B2 * | 5/2010 | Brackmann et al. | 340/539.1 |
| 8,321,124 B2 * | 11/2012 | Curatolo et al. | 701/300 |
| 2002/0053974 A1 * | 5/2002 | Beken | 340/539 |
| 2002/0120561 A1 * | 8/2002 | Chin et al. | 705/38 |
| 2003/0179073 A1 * | 9/2003 | Ghazarian | 340/5.6 |

(Continued)

FOREIGN PATENT DOCUMENTS

| | | |
|---|---|---|
| BE | 1012799 A6 | 3/2001 |
| EP | 1 895 456 A1 | 3/2008 |
| WO | 2006026953 A1 | 3/2006 |

OTHER PUBLICATIONS

Form PCT/ISA/210, International Search Report mailed Jan. 30, 2009, Application No. PCT/US 08/08780 filed Jul. 18, 2008, 2 pages.

(Continued)

*Primary Examiner* — George Bugg
*Assistant Examiner* — Naomi Small
(74) *Attorney, Agent, or Firm* — Carol N. Green, Esq.

(57) ABSTRACT

The present invention is directed to a system and method for countering terrorism by monitoring shipping containers using an advanced communication system network for tracking and monitoring the container as it travels over international seas.

19 Claims, 7 Drawing Sheets

(56) References Cited

U.S. PATENT DOCUMENTS

| | | | |
|---|---|---|---|
| 2004/0113783 A1* | 6/2004 | Yagesh | 340/568.1 |
| 2004/0183673 A1 | 9/2004 | Nageli | |
| 2004/0227630 A1* | 11/2004 | Shannon et al. | 340/539.22 |
| 2004/0257223 A1 | 12/2004 | Webb, Sr. | |
| 2005/0073406 A1 | 4/2005 | Easley et al. | |
| 2005/0110635 A1* | 5/2005 | Giermanski et al. | 340/539.22 |
| 2005/0116635 A1* | 6/2005 | Walson et al. | 313/512 |
| 2006/0291657 A1 | 12/2006 | Benson et al. | |
| 2008/0143523 A1* | 6/2008 | Ekstrom | 340/545.6 |
| 2009/0224966 A1* | 9/2009 | Boling et al. | 342/357.1 |

OTHER PUBLICATIONS

Supplementary EP Search Report dated Jan. 13, 2014, Application No. EP 08 87 6592, 2 pages.

\* cited by examiner

SYSTEM AND METHOD FOR COUNTERING TERRORISM BY MONITORING CONTAINERS OVER INTERNATIONAL SEAS

FIELD OF THE INVENTION

The present invention is directed to a system and method for countering terrorism by monitoring shipping containers using an advanced communication system network for tracking and monitoring the container as it travels over international seas.

BACKGROUND OF THE INVENTION

Issues of homeland security are of paramount concern to most countries, yet several countries' domestic borders including the United States, remain vulnerable with respect to shipping containers that are being transported over international seas. The problem is widespread as the majority of the world's dry goods are imported by ships. When containers leave their ports of origin for a given destination, it is not uncommon for a ship to make several different stops at varied international ports and intermediate domestic ports before they reach their final destination.

If during the voyage, a container's seal has been breached while the ship is docked at a foreign port, and its contents have been stolen, removed, or replaced with weapons or explosives, it is very difficult to track intelligence information regarding who committed the act, where, when, and how such an event occurred. In fact Customs may not be aware that the container's contents have been substituted for example with explosives, which have disastrous results. Similarly, if the container was tampered with at its port of origin, or at an intermediate domestic port before landing at its final port of disembarkation, without tracking the activities of a container there is no way of knowing what happened. Thus, there needs to be a system and method for tracking and monitoring the contents of each container from the point of origin to its arrival at its final port of disembarkation.

The problem is further compounded by international bureaucracy and language barriers which will trump any extraordinary efforts to warn a foreign port of a suspicious container that may or may not appear to be compromised. Generally, foreign Customs are unconcerned with the integrity of containers that are being imported into another country beyond their borders. As a result there is little or no sharing of intelligence information among the different foreign ports that a container may have passed through. Thus, there is a need for a system and method for sharing intelligence information with different foreign countries regarding activities at sea for shipping containers in a seamless and efficient manner.

Problems also arise when the containers reach the first domestic port, as most domestic ports are ill equipped and understaffed to process the volume of containers that are being shipped in and out of the port. Generally, consumers are not interested in waiting for an extended period for imported dry goods and understandably, retailers are very concerned about losing their competitive edge. Thus, there is additional pressure on Customs agents from the importers to have their goods clear Customs quickly, so that the goods can be forwarded to the retailers and ultimately to the consumers as fast as possible. Not surprisingly, 90% of shipping containers and their respective contents are not inspected prior to clearing Customs. If weaponry or explosives were smuggled into the containers and managed to be shipped undetected, unless the container was among the 10% of inspected containers they could be cleared for import and the Customs or border patrol would be unaware of their existence. Thus, there exists a need for a system and method for processing each and every shipping container in an expedient, efficient manner.

There also exists a need for a system and method to be able to protect a country's national borders from the illegal importation of arms, weapons and explosives via shipping containers.

This invention satisfies those long felt needs and solves the foregoing problems that the prior art has been unable to solve in a new and novel manner.

SUMMARY OF THE INVENTION

The present invention relates generally to a system and method for monitoring containers where each container is provided with an autonomous battery powered monitoring device. Each monitoring device has a unique identifier used to identify and register the importer/exporter with a monitoring center. The unique identifier is also printed on the importer's/exporter's Bills of Lading tendered to the United States Customs Office prior to the importer clearing their goods. In one embodiment of the invention, each item in the container is also labeled with the unique identifier or some variation thereof, such that if an item has been wrongfully removed or stolen there is a system and method for tracking the item for its return to its rightful owner.

Pursuant to the invention, when a shipping container is packed and ready for shipping at the Port of Origin ("POO"), the container is sealed by inserting the monitoring device into a lock box that is affixed to the container's exterior. Access to the container is therefore restricted and necessitates authorized access to the lock box and monitoring device. The lock box also houses the battery charger, i.e. the power supply, which is in mating engagement with the monitoring device. The monitoring device is then activated, and a mode of operation is selected depending on the circumstances, e.g. active mode if the ship is ready to sail. If it becomes necessary to add contents to the sealed container, the monitoring device can be deactivated for loading. However, a minimum amount of time will be allotted for loading and transporting the container to the shipping vessel, after which the monitoring device automatically resets itself for active mode, where it records and reports all activities to the monitoring center. The monitoring device is also encoded to report and trigger an alarm for any suspicious activity.

Access to the lock box and the sealed container after the monitoring device has been activated for active mode, will require at a minimum, the input of the correct electronic key. The monitoring device also records all invalid attempts to input an incorrect electronic key and may trigger an alarm to the monitoring center depending on the preset limits for the number of invalid attempts allowed. It is understood that the electronic key is considered proprietary information that will only be provided to the necessary parties, based on their individual security clearance, e.g. Customs agents, inspectors, etc. Similarly, if someone breaks into a sealed lock box and the respective container, an alarm event is triggered and information concerning that event will be reported to the monitoring center. As such, the breached container can be readily identified and isolated for inspection.

Upon activation, the monitoring device will consistently acquire its Global Positioning System ("GPS") coordinates, time, date, etc. and other pertinent reporting information, including but not limited to, optional sensory information, e.g. time, date, temperatures, etc., and send a message, such as an SMS message, to the monitoring center identifying its location. The monitoring device further sets itself into geofencing mode, i.e. defining a virtual limitation on the sealed container's movements to a predetermined radius by tracking the sealed container movements using a GPS. If the sealed container is moved beyond the predetermined radius, the monitoring device sends a message to the monitoring center which verifies that the sealed container is still within the confines of the ship or other known locations at the POO, e.g. loading dock, storage, on the ship, etc.

Once the ship leaves the POO and sets sail, the monitoring device enters into sleep mode for an estimated minimum sail time period. The estimated minimum sail time is the estimated minimum time required for the ship to travel from the POO to the Port of Disembarkation ("POD"). Sleep mode allows the monitoring device to operate in standby mode where it can continue to record information without actively using its power supply. Periodically, over the course of the voyage the monitoring device awakens, acquires its GPS coordinates, alarm events, distance traveled, movements, time, etc. and stores that information in memory, and returns to sleep. If an event occurs, a break-in or an unauthorized attempted entry to the lock box and sealed container, the monitoring device is automatically activated, gathers that information and reports the information at the earliest opportunity to the monitoring center. As the estimated minimum sail time ends, the monitoring device automatically awakens and resets itself for "approach mode" which is equated to the ship approaching domestic waters. The monitoring device will orient itself to determine and identify the closest United States seaport where the container will be subjected to inspection by a Customs Agent for entry into the United States.

As soon as the monitoring device determines from its GPS coordinates that it is within a certain radius of a nearby monitoring center, the monitoring device will start downloading the stored data to the monitoring center for processing. In this manner, Customs is provided with the information for each and every monitored container prior to the ship docking within the port, facilitating early detection and implementation of remedial measures for suspicious containers. If no alarm events were registered for a particular container, the container can be readily cleared through Customs on a more expedient basis. However, if suspicious activities were reported for a particular container, depending on the reported information, Customs has an early opportunity to detect potential threats and if necessary divert the ship to a port where the disaster can be contained and/or minimized.

A primary objective of the invention is to provide a system and method of monitoring shipping containers as they travel across international open seas.

Another object of the invention is to provide monitoring service for shipping containers that overcomes the limitations of the prior art.

Another object of the invention is to provide a monitoring device for detecting unauthorized access to a sealed container.

Yet another objective of the invention is to provide a system and method of monitoring alarm events for a sealed container from the port of origin to the port of disembarkation as a shipping container travels through open seas.

Another objective of the invention is to readily identify the identity of an importer/exporter for a container that is of interest.

Yet another objective of the invention is to readily identify which container(s) take priority for inspection.

Another objective of the invention is to provide a system and method of efficiently inspecting all shipping containers in an expedient manner.

Yet another objective of the invention is to provide the opportunity to learn of compromised containers prior to the shipping containers arriving into a port.

Another object of the invention is to obtain advance notice of any shipping containers that are not in conformity with the United Stets shipping protocol, prior to the ship reaching domestic ports.

Yet another objective of the invention is to provide a system and method of inspecting each and every container that is being shipped.

Another objective is to have a real time access to intelligence information concerning each and every container on a ship prior to the ship's approach into the port.

For a further and more fully detailed understanding of the present invention, various objects and advantages thereof, reference is made to the following detailed description and the accompanying drawings.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DESCRIPTION OF THE PREFERRED EMBODIMENTS

The present invention is now described in more detail by reference to the exemplary drawings in detail wherein like numerals indicate like elements throughout the various views. This is for convenience only and is not intended to limit the application of the present invention. In fact, after reading the following description, it will be apparent to one skilled in the relevant art(s) how to implement the following invention in alternate embodiments.

Figure 1:
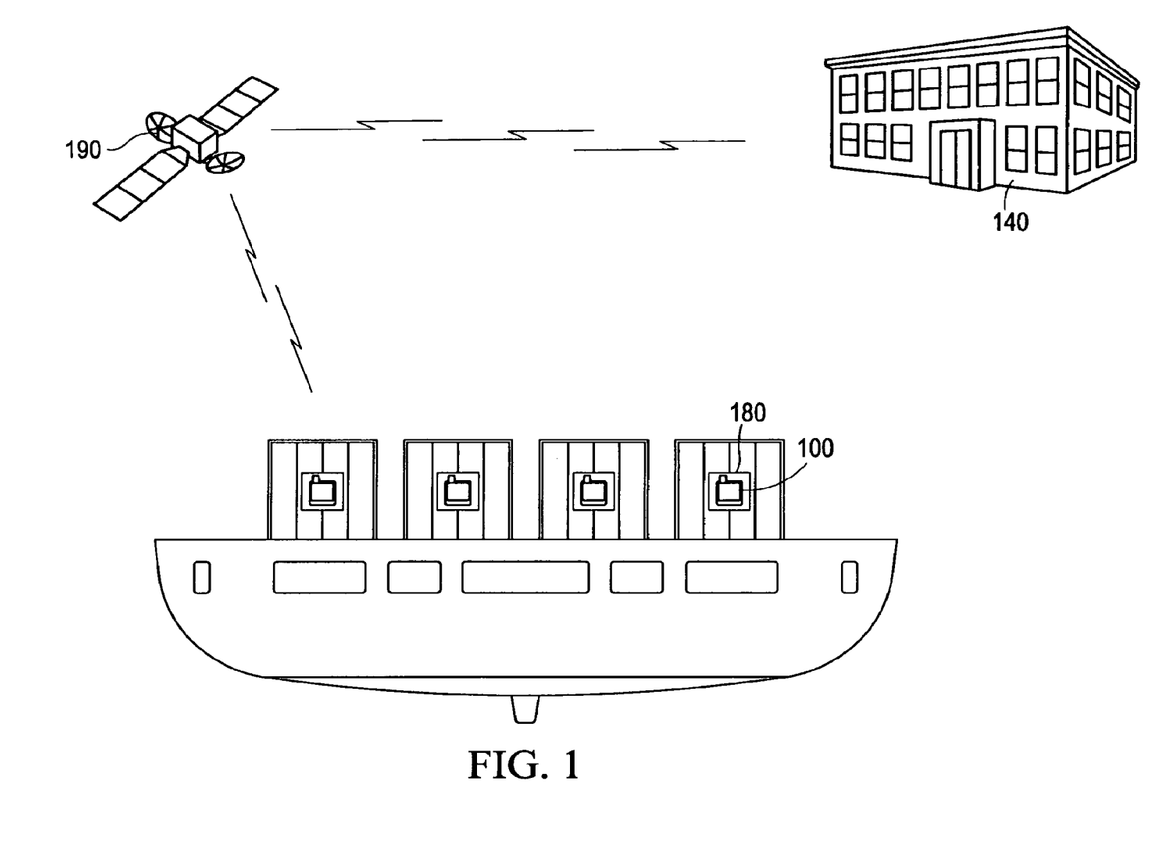
FIG. 1 is an illustrative view of the network system of an embodiment of the invention.

FIG. 1 is an illustrative view of the network system of an embodiment of the invention. In accordance with the system and method for monitoring containers, each container is provided with an autonomous battery powered monitoring device 100. The monitoring device 100 is further provided with a Global Positioning System (GPS) transponder 120 (not shown) with transmitting means 110 (not shown) for transmitting at least one signal to a monitoring center 140 notifying the monitoring center 140 of the container's geographical coordinates, and if necessary, optional sensory information. The GPS transponder 120 (not shown) also has receiving means 130 (not shown) for receiving at least one signal from a monitoring center 140. Both the transmitting means 110 and the receiving means 130 may communicate with either a geosynchronous (GEO) or Low Earth Orbit (LEO) satellite in a network. The monitoring center 140 is able to monitor signals received by a communication system 150, which is preferably a satellite system 190, from each monitoring device 100.

Each monitoring device 100 has an electronic key 160 (not shown) which may comprise of a combination of alphanumeric characters which may be encoded to identify the customs agent who last inspected the container prior to sealing. Each monitoring device 100 is also provided with a unique identifier 170 (not shown), used to identify and register each importer/exporter with the monitoring center 140 at a remote location. As such, when the monitoring device 100 is relaying information to the monitoring center 140, the importer/exporter's identity and contact information can be readily determined from their unique identifier 170 (not shown) for a targeted response.

As seen in FIG. 1, the monitoring device 100 is housed in a lock box 180, which is preferably located on the exterior of the container where it has an optimal chance of having a sky view, i.e. open access to a satellite system 190 during the voyage. As shown in FIG. 1, the lock box 180 is positioned midway on the container's doors. This is shown for purposes of example only and the lock box 180 may be positioned along any portion of the container's exterior. Additionally, it is preferred that the lock box 180 is formed from a rigid and waterproof material to prevent accidental and inadvertent activation of the monitoring device 100, and to protect the monitoring device 100 from water penetration. The lock box 180 is preferably transparent with access provided for the activation buttons of the monitoring device 100 and the monitoring device's antennae 150. When a container is packed and ready for shipping, the container is locked and sealed by placing the monitoring device 100 into the lock box 180 where it is connected to its battery power supply 18 and activated by entering its electronic key 160 (not shown). Upon activation, the monitoring device 100 will start transmitting and receiving messages to the monitoring center 140 via its transmitting 11 and receiving means 130 from the port of origin.

Figure 2A:
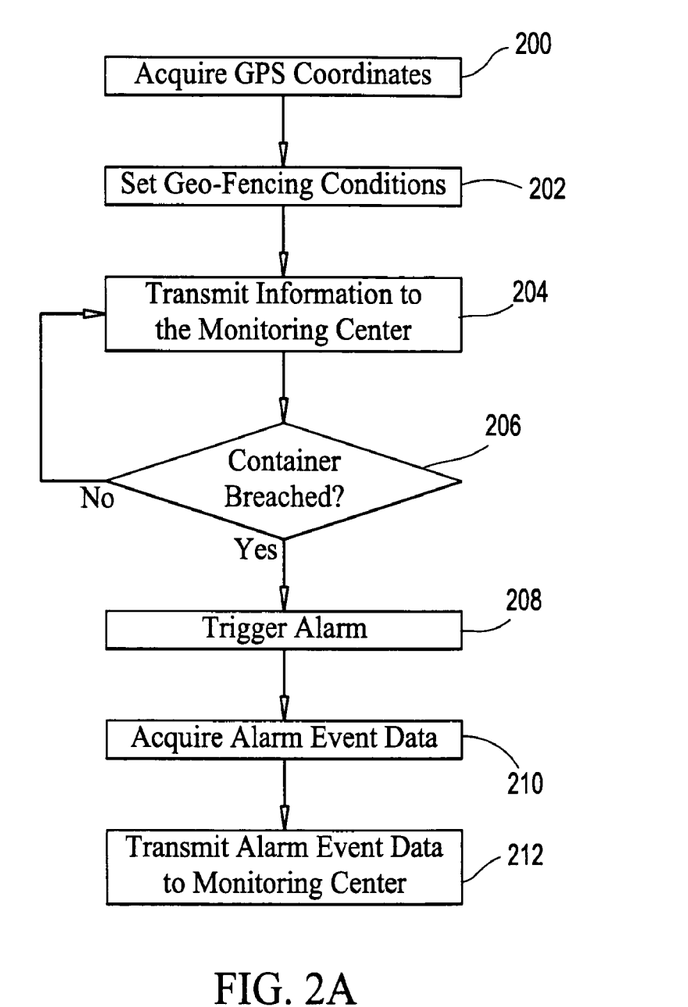
FIG. 2A is a sample flowchart of a method of reporting according to one embodiment of the invention.

FIG. 2A is a flowchart of a sample method of reporting according to one embodiment of the invention. In Step 200 the monitoring device 100, once activated, acquires its current GPS coordinates and other optional sensory information, e.g. time, date, temperature. The monitoring device 100 automatically sets itself into geofencing mode (Step 202) with limitations for a predetermined radius from the current coordinates of the sealed container. Monitoring device 100 then, in Step 204, encrypts and transmits the information via wireless communications or short range protocol, e.g. SMS message 241 (not shown), to the communication system 150 via its transmitting means 110. The communication system 150 receives the SMS message 241 (not shown) and re-transmits the SMS message 241 (not shown) to the monitoring center 140. Said short range wireless protocol may include but is not limited to Blue Tooth, Zigbee, 802.11 series, or any other proprietary short range wireless protocol that is well known and used in the arts and other future short range wireless protocol suitable for transmitting data over a short distance.

If it is determined, in step 206 that the container has been breached, e.g. an attempt is made to pry open the sealed container, both successful and unsuccessful attempts will be recorded by the monitoring device 100 and an alarm is triggered (step 208). Monitoring device 100 will then automatically acquire pertinent data for the alarm event (step 210), e.g. distance traveled, movements, duration of prolonged movements, etc. and transmit the alarm event information in step 212 to the monitoring center 140. Monitoring center 140 then verifies that the sealed container is still within the confines of the ship or other known locations at the POO, e.g. loading dock, storage, on the ship. Alternatively, if the container has not been breached, the monitoring device 100 will continue to acquire and transmit data as shown in step 204 for the container and report the information to the monitoring center 140.

Figure 2B:
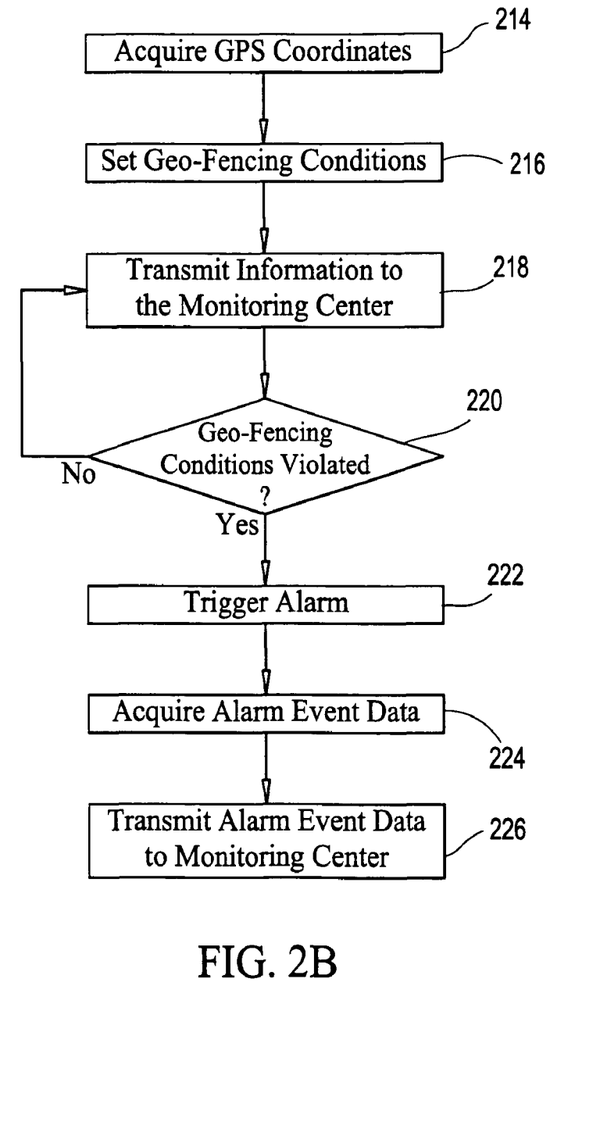
FIG. 2B is sample flowchart of a method of reporting according to another embodiment of the invention.

Referring now to FIG. 2B, a flowchart of a sample method of reporting according to another embodiment of the invention is shown. Here, steps 214-218 are similar to steps 200-204 in FIG. 2A. If it is determined in step 220 that the container's geofencing conditions have been violated, an alarm is triggered (Step 222). The monitoring device 100 will then automatically acquire information for the alarm event (step 224) and transmit the alarm event information to the monitoring center 140 in step 226.

Figure 2C:
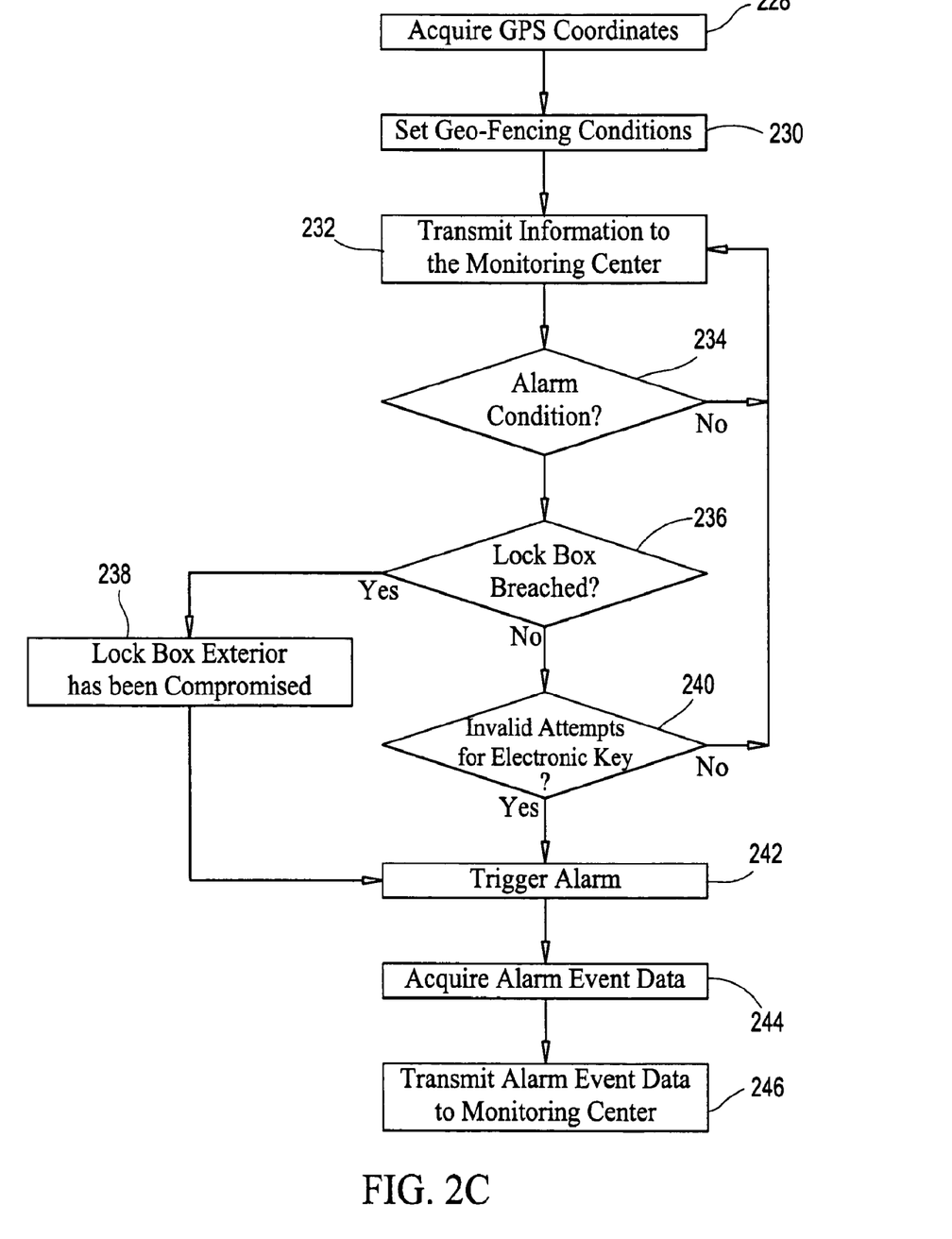
FIG. 2C is a sample flowchart of a method of reporting according to a further embodiment of the invention.

Referring now to FIG. 2C, a flowchart of a sample method of reporting according to a further embodiment of the invention is shown. Here, steps 228-232 are similar to steps 200-204 in FIG. 2A. If monitoring device 100 in step 234 determines that an unusual situation exists i.e. an alarm condition, monitoring device 100 in step 236, checks to see if the lock box 180 has been breached e.g. pried open. If a breach is detected, monitoring device 100 notes whether the lock box's 180 exterior has been compromised in Step 238, as the lock box 180 may have been accidentally broken open by surrounding containers or other cargo thereby exposing the monitoring device 100 to the elements, in which case an alarm is triggered (step 242).

If, however, the monitoring device 100 does not detect a breach of the lock box 180, the monitoring device 100 in step 240 determines whether there has been an invalid attempt to enter the electronic key 160 in excess of the preset allocated maximum invalid entries allowed in which case an alarm is triggered (step 242). Monitoring device 100 then acquires the alarm event data in step 244 and transmits the alarm event data collected to the monitoring center 140 as shown in step 246. If monitoring device 100 fails to detect an alarm condition or invalid attempts to unlock the electronic key 160, monitoring device 100 continues to collect and transmit regular container information as shown in step 232.

Figure 3:
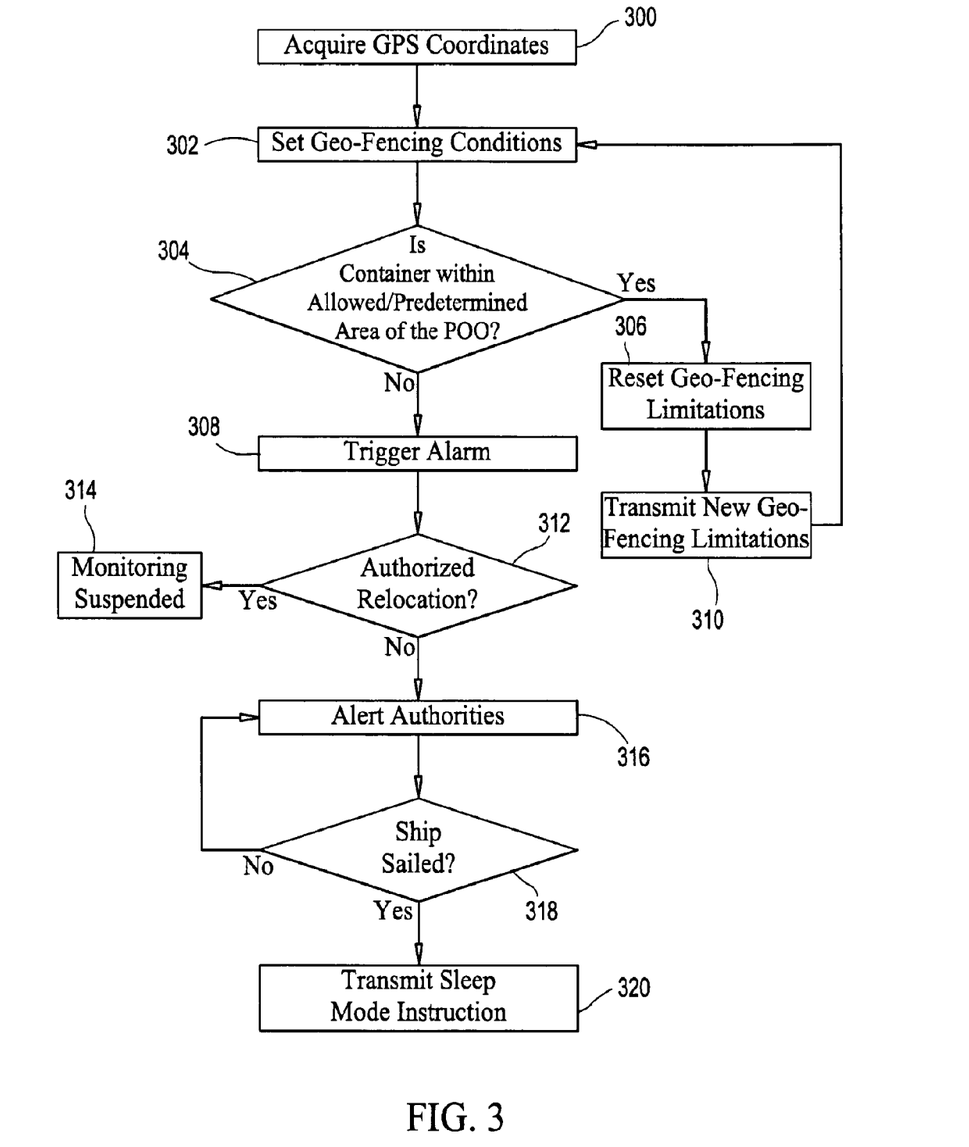
FIG. 3 is a flowchart of a sample method of communications between the monitoring center and the monitoring device from the POO.

Referring now to FIG. 3 a flowchart of a sample method of communications according to another embodiment of the invention is shown. Communication between the monitoring center 140 and the monitoring device 100 from the POO is illustrated in FIG. 3. Once the monitoring device 100 has been activated and establishes itself in the geofencing mode, the monitoring center 140 in step 300 receives the geofencing limitations from the monitoring device 100, and verifies the geographical coordinates of the sealed container (Step 302) to confirm that the sealed container is still within the confines of known POO locations. If the sealed container is within known POO's locations, the monitoring center 140 in step 306 sets new geofencing limitations for the monitoring device 100 and its respective sealed container and transmits the reset geofencing limitations in step 310 to the monitoring device 100, and will verify any subsequent violations of the reset geo-fencing limitations by returning to Step 302.

If it is determined in step 304 that the sealed container has been moved beyond the POO, and/or violates the geofencing conditions, an alarm will be triggered as shown in Step 308 at the monitoring center 140 wherein the monitoring personnel may confirm with the appropriate parties in step 312 that the sealed container's relocation outside of the confines of the known POO locations was authorized. The appropriate parties may include but is not limited to, the importer/exporter, law enforcement, the shipping brokers, Customs, etc. If the sealed container's relocation was authorized, the monitoring activity may be suspended as shown in step 314 or adjusted to monitor the sealed container on land. However, if the sealed container's relocation was not authorized the monitoring center can readily alert the appropriate authorities in step 316 with respect to the container's movement. Accordingly, if the sealed container is stolen or diverted from the POO for nefarious purposes prior to being shipped, there is a system and method for early notification to, and intervention by the appropriate parties in the event of an alarm.

The monitoring center 140 will attempt to stay in communication with the monitoring device 100 while the ship remains in port at the POO and will verify in step 318 that the ship has not yet sailed. Once the ship leaves the POO, the monitoring center 140 registers the event as departure and transmits an encrypted SMS instruction to the monitoring devices 10 to enter into sleep mode (Step 320) for the estimated minimum sail time. While in sleep mode any significant or prolonged motion, e.g. longer than 30 seconds, is detected and activates the monitoring device 100 which records the event. If the motion continues for a significant or prolonged period of time, the monitoring device 100 may send an alarm to the monitoring center 140 for a response and inquiry.

During the voyage, the monitoring device 100 periodically activates and acquires its GPS coordinates, distance traveled, time and other data which it records into its internal memory before reverting to its sleep mode. As the estimated minimum sailing time expires, the container is presumed to be approaching the POD within domestic borders. As such, the monitoring device 100 awakens and automatically resets itself to approach mode. In the approach mode, the intervals between sleep and awake are shortened, as the monitoring device 100 verifies the availability of satellite network coverage, keeps acquiring its GPS coordinates, determines and identifies the closest domestic seaport.

Figure 4:
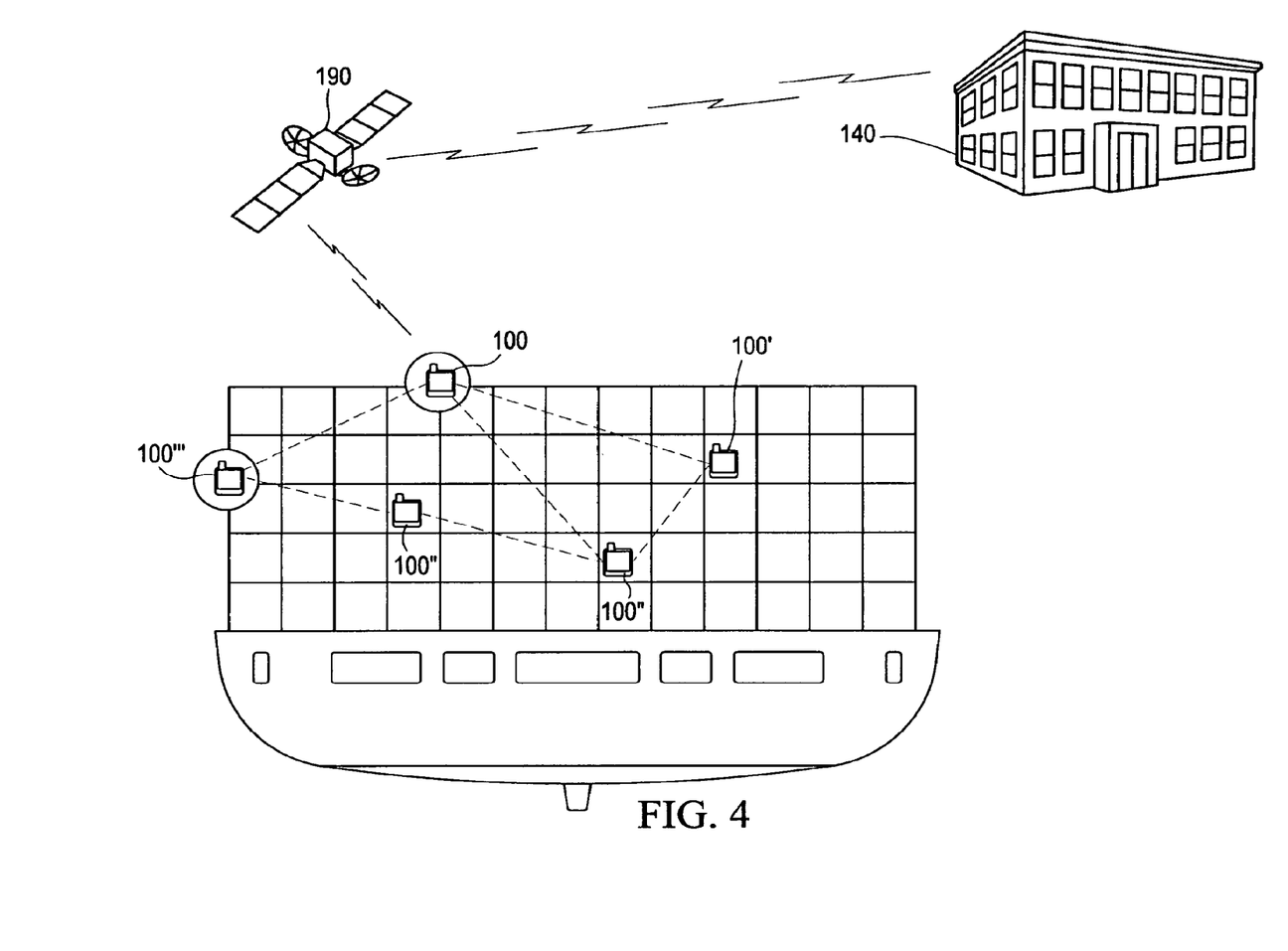
FIG. 4 is a block diagram of a sample reporting method of an exemplary embodiment of the invention.

FIG. 4 illustrates a plurality of monitoring devices 10 in communication in a mesh network configuration. Understandably, not all containers and their respective monitoring devices 10 will have a sky view facilitating ready transmission of data between the monitoring device 100 and the monitoring center 140. As such, certain monitoring devices 10 may need to transfer its information to one or more neighboring monitoring devices 10, 10' to relay its information to and from the monitoring center 140. The monitoring device 100 uses its short range protocol 50 or wireless local area network (WLAN) to communicate with the satellite system 190. Said short range protocol 50 or wireless local area network (WLAN) may include but is not limited to, Bluetooth, Zigbee, 802.11 series or other proprietary wireless protocol capable of transmitting data over a short range.

As seen in FIG. 4, a first monitoring device 100 via its transmission means 11 may randomly poll one or more neighboring monitoring devices 10', 10" receiving means 130 in a manner similar to mesh network, for information concerning their access to a satellite network system. It is understood that this mesh network may be formed dynamically on an as-needed basis as the monitoring device 100 systematically polls other neighboring monitoring devices 100, 100' until a monitoring device 100 with direct access to a satellite 190 network system is located. Once located, the monitoring device 100 will determine a relay path of transmission for the most direct route to satellite 190 network system, and thereby transmit data via transmission means 11 from the first monitoring device 100 to at least one alternate receiving means 130 in another monitoring device 100. The data for the first monitoring device 100 will be transferred along the transmission path determined to at least one other monitoring device's 100 transmission means 100 to the monitoring center 140. Accordingly, recorded information can be transmitted and stored with a neighboring monitoring device 100 for later reporting as needed.

Figure 5:
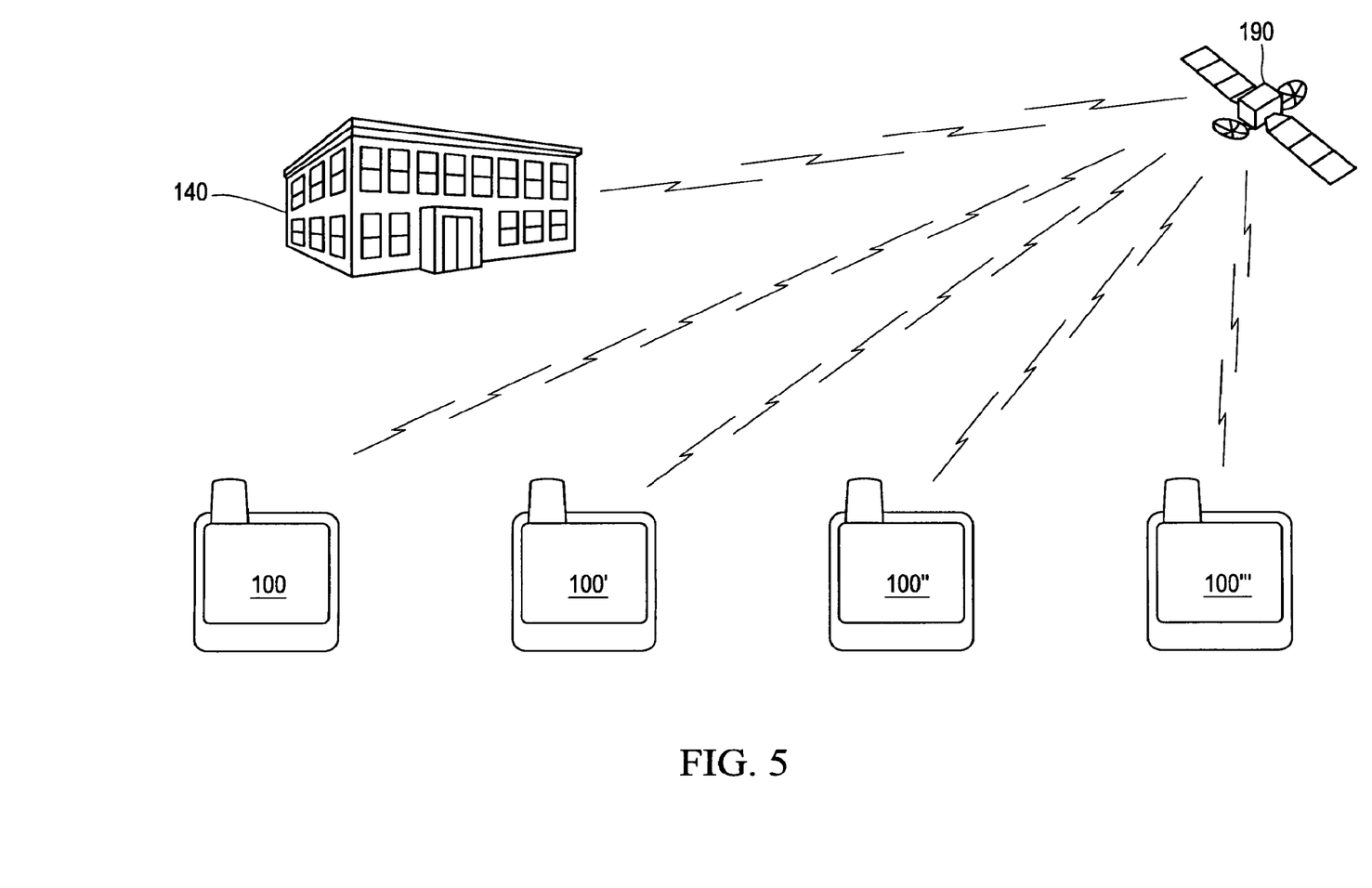
FIG. 5 is a block diagram of a sample reporting method of an exemplary embodiment of the invention.

FIG. 5 is a block diagram of a sample reporting method of an exemplary embodiment of the invention. As the ship approaches the first domestic port, which may or may not be the POD, as soon as satellite access is established, the monitoring device 100 automatically starts transmitting the stored information via its transmitting means 110 to the monitoring center 140 in real time prior to the ship reaching the port. The monitoring center 140 as part of its monitoring services provides report generating means for all activities for each container provided with a monitoring device 100. The monitoring center 140 can therefore generate reports in readable format for US Customs to readily identify containers of interests, and/or confirm that a sealed container is ready to be cleared once the ship arrives. As such, if there is a container of interest, the monitoring center 140 notifies the appropriate responders, e.g. Homeland Security and/or Customs, prior to a container of interest reaching the port, facilitating early intervention or even diversion from the original domestic port if necessary.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the system and method describe above and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A system for countering terrorism comprising:
   (a) a lock box provided for a shipping container wherein each lock box includes a power supply, a first monitoring device in mating engagement with said power supply, wherein said first monitoring device has a unique identifier for identifying and registering an importer or exporter with a monitoring center at a remote location; and
   (b) an electronic key for activating said first monitoring device, wherein said first monitoring device is provided with transmitting means for transmitting at least one signal to said monitoring center, wherein upon departure from a port of origin said monitoring center transmits an encrypted instruction to a receiving means of said first monitoring device to enter a sleep mode for an estimated minimum sail time whereby the first monitoring device periodically activates itself acquires and records sensory information before reverting back to sleep mode until the estimated minimum sail time expires and wherein said first monitoring device awakens, automatically resets from sleep mode to an approach mode and determines the closest domestic seaport for downloading the acquired sensory information, communicating the sensory information via its transmitting means in a mesh network configuration through neighboring monitoring devices, that is at least a second monitoring device if said first monitoring device lacks direct access to a satellite network system;

(c) means for triggering an alarm event at the monitoring center and wherein said monitoring center monitors signals received by a communications system from said first monitoring device and include report generating means for reporting all sensory information for said first monitoring device and each container provided with monitoring devices, and wherein said monitoring center provides early notification to authorized parties in the event of an alarm.

2. The system of claim 1, wherein said monitoring center provides monitoring services and early notification at any one of the following locations: a port of origin, a domestic port, a port of disembarkation, or on land.

3. The system of claim 1, wherein upon activation, said first monitoring device implements a geofencing mode defining a virtual limitation on the shipping container's movements to a predetermined radius by tracking the shipping container's movements.

4. The system of claim 1, wherein said transmitting means comprises of a Global Positioning System transponder.

5. The system of claim 1, wherein said lock box is formed from a rigid and waterproof material for preventing inadvertent activation of the monitoring device and wherein said lock box further protects the monitoring device from water penetration.

6. A method for countering terrorism comprising:
a. registering an importer or exporter with a monitoring center at a remote location based on a unique identifier that is provided for a monitoring device, said monitoring device also having an electronic key for activation, and wherein said monitoring device is housed in a lock box on a shipping container;
b. transmitting at least one signal by said monitoring device to a monitoring center and said monitoring center transmitting upon departure from a port of origin an encrypted instruction to a receiving means of said first monitoring device to enter a sleep mode for an estimated minimum sail time whereby the first monitoring device periodically activates itself acquiring and recording sensory information before reverting back to sleep mode until the estimated minimum sail time expires and wherein said first monitoring device awakening, automatically resetting from sleep mode to an approach mode and determining the closest domestic seaport for downloading the acquired sensory information, communicating the sensory information via its transmitting means in a mesh network configuration through neighboring monitoring devices, that is at least a second monitoring device if said first monitoring device lacks direct access to a satellite network system, wherein said monitoring center comprises of means for triggering an alarm event at the monitoring center; and
c. monitoring signals received by a communications system from said first monitoring device that are transmitted to the monitoring center for, and generating reports for all sensory information for said first monitoring device and each container provided with monitoring devices, and providing early notification to authorized parties in the event of an alarm.

7. The method of claim 6, wherein said monitoring services and early notification are provided at any one of the following locations: a port of origin, a domestic port, a port of disembarkation, and on land.

8. The method of claim 6, further comprising implementing upon activation a geofencing mode defining a virtual limitation on the shipping container's movements to a predetermined radius by tracking the shipping container's movements.

9. The method of claim 6, wherein said transmitting means comprises of a Global Positioning System transponder.

10. The method of claim 6, wherein said lock box is formed from a rigid and waterproof material for preventing inadvertent activation of the monitoring device and wherein said lock box protects the monitoring device from water penetration.

11. The system of claim 1, wherein the transmitting means transmits a message to the monitoring center if the shipping container is moved beyond the predetermined radius.

12. The system of claim 1, further comprising the transmitting means of said first monitoring device systematically polling a receiving means within at least one other neighboring monitoring device regarding their access to said satellite network system and locating the at least a second monitoring device with direct access to said satellite network system.

13. The system of claim 12, further comprising the transmitting means of said first monitoring device determining a dynamic relay path of transmission for the most direct route to the satellite network system from the first monitoring device to the at least second monitoring device, which has direct access to said satellite network system.

14. The system of claim 12, further comprising the transmitting means of said first monitoring device transmitting its sensory information to at least one receiving means in a second monitoring device, for transmission by the second monitoring device to the monitoring center.

15. The system of claim 1, wherein said transmitting means is a short range wireless protocol that includes any one of the following: Bluetooth, Zigbee, 802.11 series.

16. The method of claim 6, further comprising polling systematically a receiving means within at least one other neighboring monitoring device regarding their access to said satellite network system and locating the at least a second monitoring device with direct access to said satellite network system.

17. The method of claim 16, further comprising determining a dynamic relay path of transmission for the most direct route to the satellite network system from the first monitoring device to the at least second monitoring device, which has direct access to said satellite network system.

18. The method of claim 16, further comprising transmitting its sensory information to at least one receiving means in a second monitoring device, for transmission by the second monitoring device to the monitoring center.

19. The method of claim 6, further comprising sending a message to the monitoring center verifying the shipping container's location.

* * * * *